Patented Feb. 27, 1951

2,543,060

UNITED STATES PATENT OFFICE 2,543,060

CARBONIC ACID DERIVATIVES OF TETRAHYDROFURFURYL LACTATE

Chessie E. Rehberg, Glenside, Pa., assignor to the United States of America as represented by the Secretary of Agriculture No Drawing. Application February 8, 1949, Serial No. 75,284

9 Claims. (Cl. 260—345)

(Granted under the act of March 3, 1883, as amended April 30, 1928; 370 O. G. 757)

This application is made under the act of March 8, 1883, as amended by the act of April April 30, 1928, and the invention herein described, if patented in any country, may be manufactured and used by or for the Government of the United States of America for governmental purposes throughout the world without the payment to me of any royalty thereon.

This invention relates to compounds formed by reacting tetrahydrofurfuryl lactate with an ester of chloroformic acid.

I have found that carbonic acid derivatives of tetrahydrofurfuryl lactate can be obtained by treating this ester of lactic acid with an alkyl chloroformate according to the following equation:

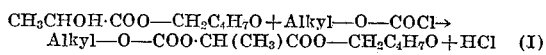

and also by reacting tetrahydrofurfuryl lactate with a glycol ester of chloroformic acid as shown in the following equation which illustrates the reaction as applied to the condensation of tetrahydrofurfuryl lactate with the diethylene glycol ester of chloroformic acid.

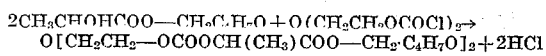

The products obtained according to either of these methods are high boiling, neutral, colorless and practically odorless liquids which possess valuable properties as plasticizing agents for synthetic resins.

The reaction shown in Equation I is applicable to any alkyl ester of chloroformic acid containing from 1 to 16 carbon atoms in the alkyl group which may be a straight chain or a branched chain alkyl group. In the reaction illustrated by Equation II, any glycol ester of chloroformic acid can be used in place of the diethylene glycol ester. Suitable esters include for example the diesters of chloroformic acid with ethylene glycol, propylene glycol, diethylene glycol, or polymethylene glycols having up to six methylene groups.

The carbonates of tetrahydrofurfuryl lactate produced according to Equation I or II are compatible with polyvinyl chloride resins and with ethyl cellulose. Those produced in accordance with the method illustrated by Equation II as well as the products of Equation I wherein the alkyl group contains no more than 4 carbon atoms are also compatible with cellulose acetate. The diethylene glycol bis (carbonate of tetrahydrofurfuryl lactate) shown in Equation II is especially valuable as a plasticizing agent because of its very high boiling point and its wide range of compatibility with both vinyl and cellulose resins. The corresponding polymethylene glycol bis (carbonates of tetrahydrofurfuryl lactate) show increased compatibility with vinyl resins and improved plasticizing characteristics with increasing number of methylene groups in the glycol radical, while their compatibility with cellulose acetate decreases accordingly.

The carbonates of tetrahydrofurfuryl lactate can be readily prepared by the following procedure.

Equimolecular amounts of tetrahydrofurfuryl lactate and pyridine are dissolved in about twice their combined volume of dry ethyl ether. The solution is maintained at about 0°–10° C. while the chloroformate, namely, one equivalent of alkyl chloroformate or one half the molecular equivalent of glycol diester of chloroformic acid, is added slowly with stirring. When all the chloroformate has been added, the reaction mixture is allowed to stand at room temperature for about one hour, after which it is washed with water, and dried. The residue obtained on evaporation of the ether consists of the corresponding carbonate of tetrahydrofurfuryl lactate, which may be distilled if desired.

The characteristics of some of the carbonates of tetrahydrofurfuryl lactate, produced by the above described procedure are listed in the following table:

TABLE I

*Carbonates of tetrahydrofurfuryl lactate*

| Example No. | Carbonate | B. P., °C./1 mm. | $n_D^{20}$ | $d_4^{20}$ |
|---|---|---|---|---|
| 1 | Ethyl | 118 | 1.4430 | 1.1384 |
| 2 | n-Butyl | 137 | 1.4451 | 1.0958 |
| 3 | n-Hexyl | 153 | 1.4470 | 1.0632 |
| 4 | n-Octyl | 171 | 1.4486 | 1.0370 |
| 5 | n-Decyl | 186 | 1.4500 | 1.0166 |
| 6 | n-Dodecyl | 204 | 1.4510 | 0.9889 |
| 7 | Diethylene Glycol | 266 | 1.4460 | 1.2297 |

The following examples illustrate the use of the carbonates of tetrahydrofurfuryl lactate as plasticizing agents.

*Example A.*—The plasticizing agent was milled into the vinyl resin (a copolymer of 95% vinyl chloride and 5% vinyl acetate) on a mill having steam-heated rolls. The plasticized mixture containing 35% by weight, plasticizer was evaluated by determination of tensile strength, ultimate elongation, modulus at 100% elongation, and brittle point. All of these conventional tests were made using standard equipment and technique well known in the art. The modulus and brittle point of some of the plasticized compositions are shown in Table II. The tensile strength and ultimate elongation of all these compositions were satisfactory. The table also shows comparable data using di-2-ethylhexyl phthalate, a widely used commercial plasticizer.

*Example B.*—Cellulose acetate and ethyl cellulose were each plasticized by dissolving 75 parts by weight of the resin and 25 parts of the plasticizing agents of examples 1–7 in acetone, and films of the plasticized resins were cast on glass plates by allowing the solvent to evaporate. If the resin and plasticizer were compatible the resulting films were clear, colorless, tough and flexible; if incompatable they were opaque and generally were hard and brittle. All the products of Examples 1–7 were compatible with ethyl cellulose. The diethylene glycol bis (carbonate of tetrahydrofurfuryl lactate) and the alkyl carbonates of tetrahydrofurfuryl lactate containing not more than four carbon atoms in the alkyl group were compatible with cellulose acetate.

Although in the foregoing examples, polyvinyl chloride and ethyl cellulose or cellulose acetate were plasticized by combining them with 35 and 25 percent by weight, respectively, of the various carbonates of this invention, the amount of these plasticizers may be varied depending on the properties desired in the final products. Thus the synthetic resin may be combined with about 5 to 50% by weight of these plasticizing agents. The resulting plasticized compositions may also have incorporated therewith various conventional ingredients such as dyes, pigments, filters and the like.

Also although the alkyl carbonates of tetrahydrofurfuryl lactate shown in Tables I and II are n-alkyl derivatives, the corresponding branched chain primary and secondary alkyl carbonates are obtained in a similar manner and display essentially analogous plasticizing properties. In general the effect of substituting a branched chain alkyl group such as for instance isobutyl, 2-ethylbutyl, 2-ethylhexyl, 2-methylbutyl, 2-methylpentyl, 6-methylheptyl and 2,5-dimethylhexyl, for a normal alkyl group in the products of this invention, is to produce a product having slightly lower boiling point and higher compatibility with synthetic resins, and to yield plasticized compositions having a higher modulus and brittle point.

TABLE II

*Properties of plasticized commercial polyvinyl chloride (a copolymer of 95% vinyl chloride and 5% vinyl acetate)*

| Plasticizer Used | Modulus at 100% elongation, p. s. i. | Brittle Point, °C. |
|---|---|---|
| Compound of Example 1 | 1,860 | −9 |
| Compound of Example 2 | 1,240 | −19 |
| Compound of Example 3 | 1,120 | −23 |
| Compound of Example 4 | 1,350 | −30 |
| Compound of Example 5 | 1,290 | −37 |
| Compound of Example 6 | 1,350 | −38 |
| Compound of Example 7 | 2,780 | 0 |
| 2 Ethylhexyl phthalate (Control) | 1,500 | −32 |

Having thus described my invention, I claim:

1. An ester of a saturated aliphatic alcohol, said alcohol containing not more than 2 hydroxyl groups and being completely esterified with the acyl group:

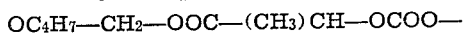

$OC_4H_7$—$CH_2$— being the radical of tetrahydrofurfuryl alcohol.

2. A compound as defined in claim 1 wherein the alcohol is a glycol.

3. A compound corresponding to the general formula

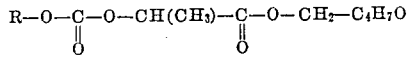

in which R is an alkyl group and —$CH_2$—$C_4H_7O$ is the radical of tetrahydrofurfuryl alcohol.

4. The compound defined in claim 3 in which the alkyl radical contains from 1 to 4 carbon atoms.

5. The compound having the formula

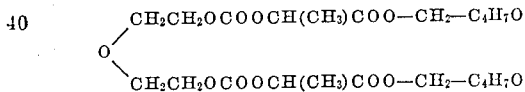

where —$CH_2C_4H_7O$ is the radical of tetrahydrofurfuryl alcohol.

6. n-Hexyl carbonate of tetrahydrofurfuryl lactate.

7. n-Butyl carbonate of tetrahydrofurfuryl lactate.

8. n-Octyl carbonate of tetrahydrofurfuryl lactate.

9. n-Dodecyl carbonate of tetrahydrofurfuryl lactate.

CHESSIE E. REHBERG.

REFERENCES CITED

The following references are of record in the file of this patent:

UNITED STATES PATENTS

| Number | Name | Date |
|---|---|---|
| 2,259,141 | Russell | Oct. 14, 1941 |
| 2,288,588 | Rieche et al. | June 30, 1942 |
| 2,410,294 | Korten | Oct. 29, 1946 |
| 2,433,645 | Bitler et al | Dec. 30, 1947 |